United States Patent Office 3,454,039
Patented July 8, 1969

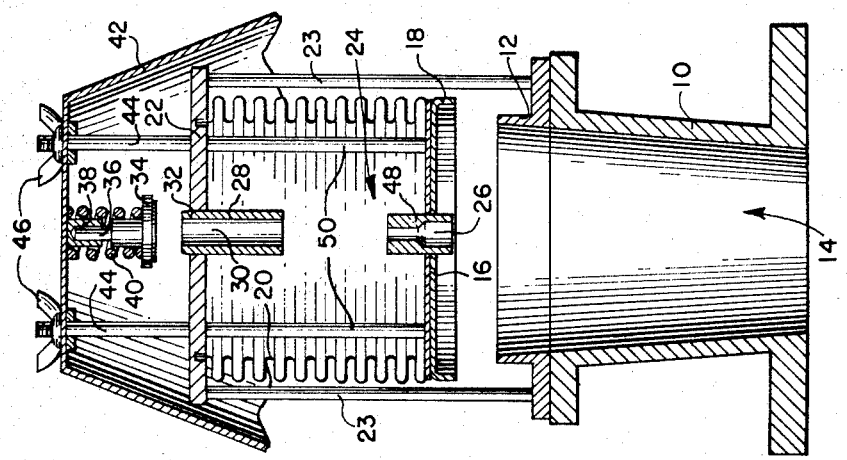
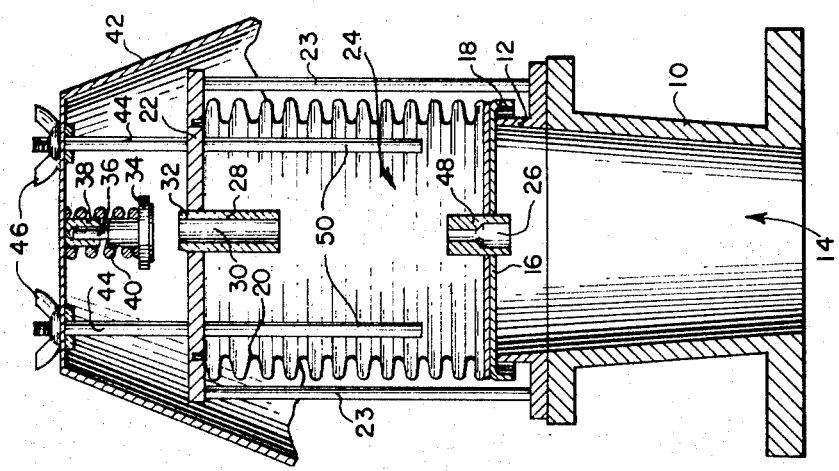
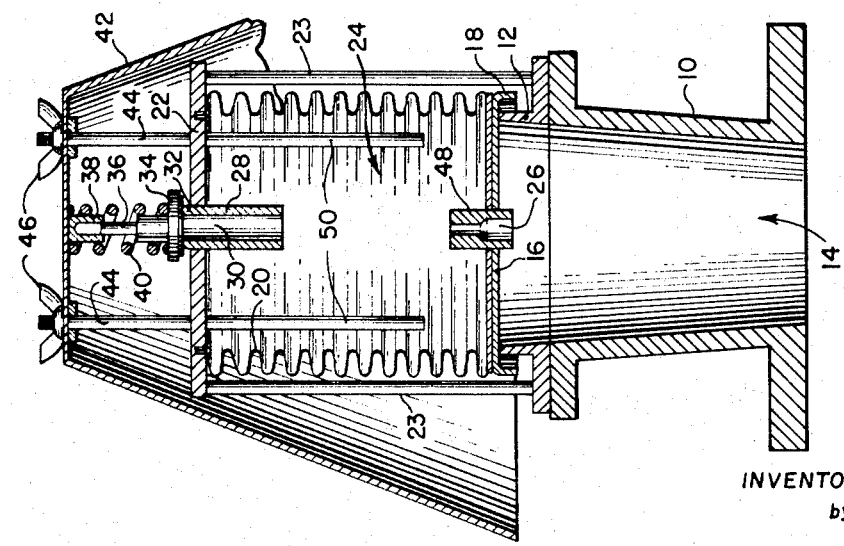

3,454,039
PILOT VALVE WITH BELLOWS VALVE BODY
Evald Dunkelis, Glen Ellyn, Ill., assignor to GPE Controls, Inc., Morton Grove, Ill., a corporation of Illinois
Filed Dec. 8, 1966, Ser. No. 600,114
Int. Cl. F16k 31/12, 31/36
U.S. Cl. 137—491     3 Claims

ABSTRACT OF THE DISCLOSURE

A pilot operated relief valve having a flexible diaphragm sealed around one end to the main pallet to define a pressure chamber. The bellows undergoes substantially axial flexing movement as the main pallet moves between open and closed positions.

---

This invention relates to pilot operated relief valves of the type commonly used in connection with tanks or containers wherein volatile liquids, or the like, are stored in order to provide controlled venting of the tank to relieve conditions of excess pressure or vacuum.

Relief valves of both the pressure and vacuum type are normally provided on storage tanks, both stationary and movable, so that the tank will not be ruptured or otherwise damaged due to large differences in pressure between the vapors inside the tank and the surrounding atmosphere. Such pressure differentials may be caused, for example, by temperature changes which cause expansion or contraction of the fluids within the tank. For many reasons it is desirable to maintain the tanks in a normally sealed condition in order to prevent the escape of vapors therefrom until a certain critical pressure differential has been reached. This differential is determined for each individual application by the volume and physical dimensions of the tank, the physical properties of the material being stored, etc.

Some of the more common prior art devices used in this context include the diaphragm type valves wherein a suitable flexible material, usually a reinformed fabric or composition material, forms a sealed attachment between the main pallet covering the tank vent opening and a rigid valve body, normally of cast metal. The diaphragm and valve body, in combination with the upper side of the main pallet form a pressure chamber so that the main pallet is exposed on opposite sides to the pressure within this chamber and within the tank. The chamber is adapted to be vented, usually to the surounding atmosphere, by means of a pilot valve which is responsive to tank pressure or vacuum. Venting of the pressure chamber through the pilot valve creates the pressure differential between the chamber and the interior of the tank which causes the main pallet to be opened and the tank vented through the main vent opening. The pilot operation, that is, the rapid venting of the pressure chamber over the main pallet, provides a quick movement of the main pallet to the fully open position, thereby avoiding valve chatter and slow leakage when the tank pressure is very close to the critical range. The pressure chamber is maintained in a sealed condition by the rigid valve body and flexible diaphragm, the latter allowing movement of the main pallet between open and closed positions.

The present invention may be similar in many respects to prior art devices of the type described above, thereby allowing the use of many individual elements and assemblies presently in standard use. The valve of the invention is intended to perform the same function as the prior art relief valves, but does so in a superior manner while being a great deal more economical in manufacture than similar prior art valves of comparable capacity. The invention utilizes an elongated bellows closed at one end by the main pallet and at the other end by a solid wall which includes an opening communicating with the pilot portion of the valve. Thus, the pressure chamber above the main pallet is defined by a flexible bellows which is firmly sealed around one end to the main pallet and, according to the prefered embodiment, undergoes substantially axial flexing movement as the main pallet moves between its open and closed positions. It may therefore be seen that the bellows, in effect, replaces both the flexible diaphragm and the rigid valve body of the prior art devices while achieving the same action. The bellows may conveniently be fabricated, according to presently well-known techniques, from suitable metals. This enables the pressure chamber defined by the bellows to withstand much greater pressures than a comparable prior art valve using the usual type of flexible diaphragm. As will be clearly apparent from the following detailed description, the bellows forms an integral, working part of the valve in the present invention and is to be immediately distinguished from prior art structures which utilize bellows as a sealing means which allow movement to be transmitted therethrough by other portions of the valve structure.

It is a principal object of the present invention to provide a novel pilot operated relief valve which is simple and economical in construction and durable and reliable in use.

Another object is to provide a relief valve which operates in a superior manner and directly utilizes the flexing movement of a bellows in moving the main pallet between open and closed positions.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawing, in which:

FIG. 1 is an elevational view, in vertical section substantially through the center line, of a relief valve showing one embodiment of the invention with both the main and pilot valves in the closed position; and FIGS. 2 and 3 are similar views of the valve of FIG. 1 showing its operation as the pilot, and then the main pallet, moves to the open position.

The embodiment of the invention illustrated in the several figures of the drawing is constructed to operate as a pressure relief valve, although it will be readily understood by those skilled in the art that the necessary elements may easily be rearranged or dimensioned as required to allow use of the valve in vacuum relief applications, which are expressly intended to fall within the scope of the invention. A number of conventional components which may be of any suitable, standard design are shown. For example, body 10 and seat 12 comprise the usual elements which are secured to a storage tank, or the like for the purpose of providing a relief valve or vent in association with the tank. The body and seat are commonly cast from a suitable metal to provide an enclosed passageway, indicated by the reference numeral 14, from the interior of the tank to the opening defined by the upper lip of the valve seat 12. Main pallet 16 is a solid, rigid member arranged to overlie the opening defined by the valve seat. Again, the main pallet may be of conventional design, the particular embodiment shown in the present drawing being, for illustrative purposes only, of the type having a downwardly extending peripheral lip 18 of somewhat greater diameter than valve seat 12. When the main pallet 16 is in the closed or covering position with respect to seat 12, as shown in FIG. 1, the interior of the tank is effectively sealed so that gases cannot enter or leave the tank through the opening defined by the valve seat. In many standard arrangements of this type a layer of flexible or resilient material is provided between the upper lip of valve seat 12 and the opposing surface of pallet 16 in order to insure a fluid-tight seal between the two.

Elongated bellows 20 is of the same cross sectional configuration as main pallet 16, normally circular, whereby the bellows comprises an open ended cylinder having convoluted side walls. Such bellows are a common item of present day manufacture and are available in a wide variety of forms and materials. Bellows 20, as used in the present invention, is preferably fabricated from a metallic material for added strength and also because a determinable spring rate, urging main pallet 16 toward engagement with seat 12, may be provided, as explained more fully hereinafter. A suitable material, especially preferred for high pressure and corrosive atmosphere applications, is stainless steel. The lower end of bellows 20 is closed by firmly sealing this end around its entire periphery to main pallet 16. The upper end of bellows 20 is closed by being firmly sealed to solid, stationary wall member 22 which is fixedly supported on a plurality of rods 23. Thus, bellows 20 provides the side walls for an enclosed chamber 24 which is bounded on one end by the upper surface of pallet 16 and on the other end by the lower surface of wall member 22.

Opening 26 is provided in main pallet 16, preferably in a centrally disposed portion, whereby the interior of the tank communicates through opening 26 with chamber 24. An opening is provided in wall member 22 through which hollow tube 28 extends. The hollow interior of tube 28 thus defines a passageway or aperture means 30 through wall member 22, whereby chamber 24 may be vented to the surrounding atmosphere, or if desired, to another enclosed area. Pilot valve seat 32 is provided by the upper edge of tube 28 and may be covered or uncovered by pilot pallet 34. The latter is provided with valve stem 36 which extends into guide means 38. Pallet 34 is urged downwardly into sealing engagement with seat 32 by spring 40.

Guide means 38 for the pilot valve stem may conveniently be provided on the lower side of the top of hood 42 which is retained in generally covering relation to the main portion of the valve by threaded rods 44 and wing nuts 46. Such hoods are commonly provided to afford some protection from the elements to relief valves, and the like, which are mounted on the outside of storage tanks. It is to be understood, however, that hood 42 is illustrated merely as an additional element commonly used with valves of this type and bears no direct relationship to the invention.

Hollow insert 48 is shown in the illustrated embodiment as extending through the opening in main pallet 16, whereby the insert defines the passageway through which gases may flow between the interior of the tank and chamber 24. Although not essential to the invention, the insert, or other such means, may conveniently include means for adjusting the size of the passageway by means of which the gases flow through the main pallet. This passageway is always constructed or adjusted to be smaller than aperture means 30 through which the gases flow between chamber 24 and the outside atmosphere, thereby insuring a rapid pressure drop in chamber 24 upon opening of the pilot pallet. It should also be pointed out that pilot operation may be achieved without direct communication between the tank and pressure chamber through the main pallet. Pilot operation must be responsive to tank pressure, but may be made so by other means, such as a separate tank connection.

Operation of the device may be easily understood by sequential reference to the figures of the drawing. The elements are shown in FIG. 1 in the fully closed position; that is, the pressure differential between the interior of the tank and the outside atmosphere is insufficient to cause operation of the valve. In this position, it will be seen that the pressure within chamber 24 is substantially the same as the pressure inside the tank. When this pressure has increased to the point where it exerts a force on the area pilot pallet 34 which covers the opening in pallet seat 32 exceeding the biasing force of spring 40, the pilot valve will open, thereby allowing the gases within chamber 24 to be vented to the surrounding atmosphere. Since the aperture is larger than opening 26, the pressurized gas will escape from chamber 24 at a faster rate than additional pressurized gas from the tank can enter the chamber. The elements are shown in FIG. 2 with the pilot valve in the open position, thereby venting the gases from chamber 24 and causing a pressure differential between the chamber and the interior of the tank.

The pilot valve remains open to permit the escape of pressurized gases from chamber 24 until the pressure within the chamber has dropped a sufficient amount below the pressure within the tank to allow main pallet 16 to be lifted off valve seat 12. As explained earlier, the relative sizes of passageway 26 and aperture 30 are so adjusted that this action takes place quickly after the opening of the pilot valve, and the main pallet is immediately lifted by an appreciable amount due to the rapid pressure drop in chamber 24. When main pallet 16 is in the open position, as shown in FIG. 3, it is restrained from an undesirable amount of lateral movement by guide rods 23, which thus serve the dual purpose of supporting wall member 22 and constraining the path of movement of main pallet 16. Thus, the main pallet is constrained to move in a substantially straight line direction between its open and closed positions, thereby resulting in substantially axial flexing of bellows 20.

Main pallet 16 will remain in the open position to allow venting of the gases from within the tank until the pressure has dropped to a level which is insufficient to overcome the weight of the pallet and/or the "spring rate" of the bellows. As is well known in the field of bellows design, particularly in the case of metallic bellows, a biasing force may be provided by stretching or compressing the bellows from its normal rest position. This biasing force, or spring rate may be used to advantage in the present invention and is a function of the wall thickness, diameter and spacing of the bellows convolutions. These design features are so chosen that the biasing force provided by the bellows will allow the desired amount of lift of the main pallet and the desired amount of overpressure relief. In certain cases it may be desirable to have a very flexible bellows so that the biasing force tending to move the pallet from the open to the closed position is relatively small while still requiring a fairly high pressure to cause the pilot to open. In such cases, the high tank pressure in conjunction with the highly flexible diaphragm may move the main pallet by an amount which causes damage, or a permanent set, to the bellows. Fixed stops may be provided in these applications to limit the opening movement of the main pallet to a desired maximum amount. Such fixed stops may take any convenient form and are shown in the illustrated embodiment, by way of example, as rods 50 extending downwardly from wall member 22. Rods 50 may, of course, be extensions of rods 44 provided a tight seal is maintained where the rods pass through wall member 22. It is emphasized, however, that the bellows will normally provide the desired function alone, whereby the use of fixed stops is not to be considered as essential to the operation of the invention.

When the valve is used in pressure relief applications, as herein described, it will normally be mounted in such a position on the tank that the weight of the pallet tends to move it to the closed position. It is to be understood, however, that the valve may be mounted in other orientations, or may be so designed for either pressure or vacuum relief applications, that the spring rate of the bellows, or additional biasing means, may be used to urge the pallet toward the closed position. After the pressure within the tank has dropped to the desired level, as determined by the biasing force provided to move the main pallet back to the closed position, the elements will be returned to the positions shown in FIG. 1.

From the foregoing description it may be seen that the valve of the present invention will operate in much the same manner as previously known pilot operated relief valves. However, it will be immediately noted that the improvement provided by the use of a flexible bellows, which provides both the walls of the enclosed pressure chamber above the main pallet and the flexibility allowing movement of the pallet between open and closed positions, and may additionally provide a predetermined biasing force on the main pallet, allows a much greater economy and flexibility of design. It is again pointed out that the bellows is used in the present invention as an integral part of the valve structure, and may be thought of as replacing the usual rigid valve body and flexible diaphragm coupling the main pallet to the body. It is not used merely to provide a seal between two compartments of a valve while allowing motion of a stem, or the like, which transmits motion from one compartment to another as is the general case with previous structures which have been termed "bellows valves."

It will thus be seen that the objects set forth above, among those made apparent from the preceding description, are efficiently attained.

Having described my invention, what I claim as new and desire to secure by Letters Patent is:

1. A relief valve structure associated with an enclosed container and movable between open and closed positions in response to changes in the level of pressure within said container, said valve structure comprising, in combination:
   (a) a valve seat defining an opening through which fluid may flow in and out of said container;
   (b) a main pallet movable with respect to said valve seat between a first position, wherein said opening is blocked to prevent the flow of fluid therethrough, and a second position, wherein said opening is unblocked to permit fluid flow;
   (c) an elongated bellows affixed at one end in sealing engagement with said main pallet on the side thereof opposite said valve seat, whereby movement of said main pallet between said first and second positions causes flexing movement of said bellows;
   (d) a solid wall member affixed in sealing engagement with the other end of said bellows, thereby forming an enclosed chamber defined by said main pallet and said wall member at the ends and by said bellows at the sides;
   (e) aperture means in said wall member through which fluid may flow in and out of said chamber, thereby allowing venting of said chamber and creating a pressure differential between said chamber and the interior of said container on opposite sides of said main pallet;
   (f) a pilot valve pallet movable between covering and uncovering positions with respect to a pilot valve seat defining said aperture means;
   (g) means for moving said pilot valve pallet between said covering and uncovering positions in response to the pressure level in said container; and
   (h) means defining a passageway through said main pallet from the interior of said container to said chamber, whereby the pressure within said container and chamber are substantially equal when said pilot valve pallet is in the covering position, and said aperture means is larger in effective cross-sectional area than said passageway whereby said chamber is vented more rapidly than said container to create said pressure differential.

2. The invention according to claim 1 wherein said solid wall member is fixedly mounted upon rigid structural members and remains stationary as said pallets and said bellows move.

3. The invention according to claim 2 wherein said structural members are so constructed and arranged that the path of movement of said main pallet is constrained thereby to cause substantially axial flexing movement of said bellows as said main pallet moves between its first and second positions.

References Cited

UNITED STATES PATENTS

| | | | |
|---|---|---|---|
| 1,585,732 | 5/1926 | Otto et al. | 251—61.4 |
| 2,630,831 | 3/1953 | Arnold | 251—46 XR |
| 3,307,575 | 3/1967 | Dickinson et al. | 137—491 |

M. CARY NELSON, *Primary Examiner.*

ROBERT J. MILLER, *Assistant Examiner.*